US008657463B2

(12) United States Patent
Lichten et al.

(10) Patent No.: US 8,657,463 B2
(45) Date of Patent: Feb. 25, 2014

(54) LIGHTING FIXTURE FOR A POULTRY HOUSE

(76) Inventors: Jan Flemming Samuel Lichten, Even Yehuda (IL); Niv Sadeh, Ramot Hashavim (IL)

( * ) Notice: Subject to any disclaimer, the term of this patent is extended or adjusted under 35 U.S.C. 154(b) by 196 days.

(21) Appl. No.: 13/163,057

(22) Filed: Jun. 17, 2011

(65) Prior Publication Data

US 2012/0002408 A1 Jan. 5, 2012

Related U.S. Application Data

(60) Provisional application No. 61/360,544, filed on Jul. 1, 2010.

(51) Int. Cl.
*F21V 23/06* (2006.01)
*F21V 7/00* (2006.01)

(52) U.S. Cl.
USPC ....... 362/231; 362/253; 362/218; 362/217.05

(58) Field of Classification Search
USPC ............ 362/231, 253, 249.02, 223, 805, 147, 362/267, 217.05, 217.01, 218
See application file for complete search history.

(56) References Cited

U.S. PATENT DOCUMENTS

| | | | | |
|---|---|---|---|---|
| 5,278,432 A * | 1/1994 | Ignatius et al. | ................. | 257/88 |
| 6,554,450 B2 * | 4/2003 | Fang et al. | .................... | 362/231 |
| 6,705,251 B2 | 3/2004 | Lorton et al. | | |
| 6,766,767 B2 | 7/2004 | El Halawani et al. | | |
| 7,083,308 B2 * | 8/2006 | Kenyon et al. | ................ | 362/374 |
| 7,152,710 B1 | 12/2006 | Huang et al. | | |
| 7,658,165 B2 | 2/2010 | Lorton et al. | | |
| 7,878,674 B2 * | 2/2011 | Crabb et al. | .................. | 362/101 |
| 8,061,865 B2 * | 11/2011 | Piepgras et al. | ............. | 362/149 |
| 8,172,422 B2 * | 5/2012 | Kim | ............................... | 362/234 |
| 8,297,782 B2 * | 10/2012 | Bafetti et al. | ................ | 362/231 |
| 8,313,224 B2 * | 11/2012 | Moyer | ......................... | 362/554 |
| 8,322,881 B1 * | 12/2012 | Wassel | .......................... | 362/247 |
| 8,523,385 B2 * | 9/2013 | Lu et al. | ........................ | 362/231 |
| 2002/0047631 A1 | 4/2002 | Pederson | | |
| 2008/0231201 A1 | 9/2008 | Higley et al. | | |
| 2009/0034294 A1 | 2/2009 | Ookawa et al. | | |
| 2009/0109708 A1 | 4/2009 | Horwitz | | |
| 2010/0079059 A1 * | 4/2010 | Roberts et al. | ................ | 313/503 |
| 2010/0265703 A1 * | 10/2010 | Hall et al. | ..................... | 362/231 |
| 2012/0326610 A1 * | 12/2012 | Lawyer et al. | ................ | 315/117 |

OTHER PUBLICATIONS

International Preliminary Report on Patentability, including Written Opinion of the International Searching Authority mailed Oct. 21, 2011, in corresponding PCT/US2011/041367 application.
Rosenboim, I., et al. "The Effect of a Green and Blue Monochromatic Light Combination on Broiler Growth and Development", Research Note, © 2004 Poultry Science Association, Inc., pp. 842-845. Hebrew University of Jerusalem.

* cited by examiner

*Primary Examiner* — Peggy A. Neils
(74) *Attorney, Agent, or Firm* — Harness, Dickey

(57) ABSTRACT

A lighting fixture for a poultry housing can generally include an elongated body and a transparent cover that is selectively coupled to the body and is configured to create an internal space with the body. A first light emitting diode (LED) can be disposed in the internal space and can be configured to emit a light having a first color. A second LED can be disposed in the internal space and be configured to emit a light having a second color that is distinct from the first color. A controller can be electrically connected to and independently control an output of the first and second LEDs.

19 Claims, 5 Drawing Sheets

LIGHTING FIXTURE FOR A POULTRY HOUSE

CROSS-REFERENCE TO RELATED APPLICATIONS

This application claims the benefit of U.S. Provisional Application No. 61/360,544, filed on Jul. 1, 2010. The entire disclosure of the above application is incorporated herein by reference.

FIELD

The present disclosure relates to poultry production and more particularly to a lighting fixture for use in a poultry house for enhancing poultry production.

BACKGROUND

This section provides background information related to the present disclosure which is not necessarily prior art.

In various industries, such as those involving agriculture, it is often necessary to manage the environment of an interior of a building. For example, certain parameters, such as temperature, ventilation and lighting can have an effect on livestock housed in such buildings. One such application where these variables become important is in a poultry house. Such facilities may be designed for manipulating the light that enters into the poultry house.

Light entering a poultry house may affect a chicken in two ways. Initially, the time frame by which a chicken becomes sexually mature can be dependent upon the seasonal cycles the chicken experiences. Further, the psychological wellbeing, and thus the physical development, of the chicken can be affected by the quantity and concentration of light it is exposed to. Turkeys or other animals are also commonly kept in such houses, and may be equally as sensitive to light variation. In many instances, it can become necessary to supplement the natural light entering the poultry house with artificial light. In other examples, artificial light may account for a substantial majority or alternatively be the only light source.

SUMMARY

This section provides a general summary of the disclosure, and is not a comprehensive disclosure of its full scope or all of its features.

A lighting fixture for a poultry housing can generally include an elongated body and a transparent cover that is selectively coupled to the body and is configured to create an internal space with the body. A first light emitting diode (LED) can be disposed in the internal space and can be configured to emit a light having a first color. A second LED can be disposed in the internal space and be configured to emit a light having a second color that is distinct from the first color. A controller can be electrically connected to and independently control an output of the first and second LEDs.

According to additional features, a reflector can be disposed in the internal space and be configured to reflect the light emitted from the first and second LEDs toward and through the transparent cover. The reflector can have a generally planar portion that surrounds a first recessed portion. At least one of the first and second LEDs can be arranged in the internal space at a location, such that the emitted light is transmitted through the first recessed portion. The first recessed portion can be formed by first reflector walls that taper in a direction toward the first or second LEDs.

The lighting fixture can further comprise a printed circuit board (PCB). The first and second LEDs can be disposed on the printed circuit board. The lighting fixture can further comprise a driver that is disposed on the PCB and that electrically communicates with the controller and the first and second LEDs. The body can have a plurality of heat dissipating fins that extend therefrom and a threaded bore that receives a coupling connected with a wire harness that electrically connects the PCB with the controller.

The lighting fixture can further comprise a seal that is disposed between the body and the transparent cover and that inhibits moisture from entering the internal space. A third LED can be disposed generally adjacent to the first and second LEDs that transmit a light having a third color through the recessed portion. According to one example, the third color can be the same as the first color and the first, second and third LEDs can cooperate to form a first group of LEDs.

According to still additional features, a fourth, fifth and sixth LED can be disposed in the internal space and cooperate to form a second group of LEDs. Each of the fourth, fifth and sixth LEDs can emit a light having either the first or the second colors. The reflector can further include a second recessed portion. The second group of LEDs can collectively transmit light through the second recessed portion. The second recessed portion can be formed by second reflector walls that taper in a direction toward the second group of LEDs.

According to some embodiments of the present teachings, the first color can be blue and the second color can be green. According to other embodiments, the first color can be red and the second color can be white. The output of the first and second LEDs can include at least one of an intensity and duration of light emitted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
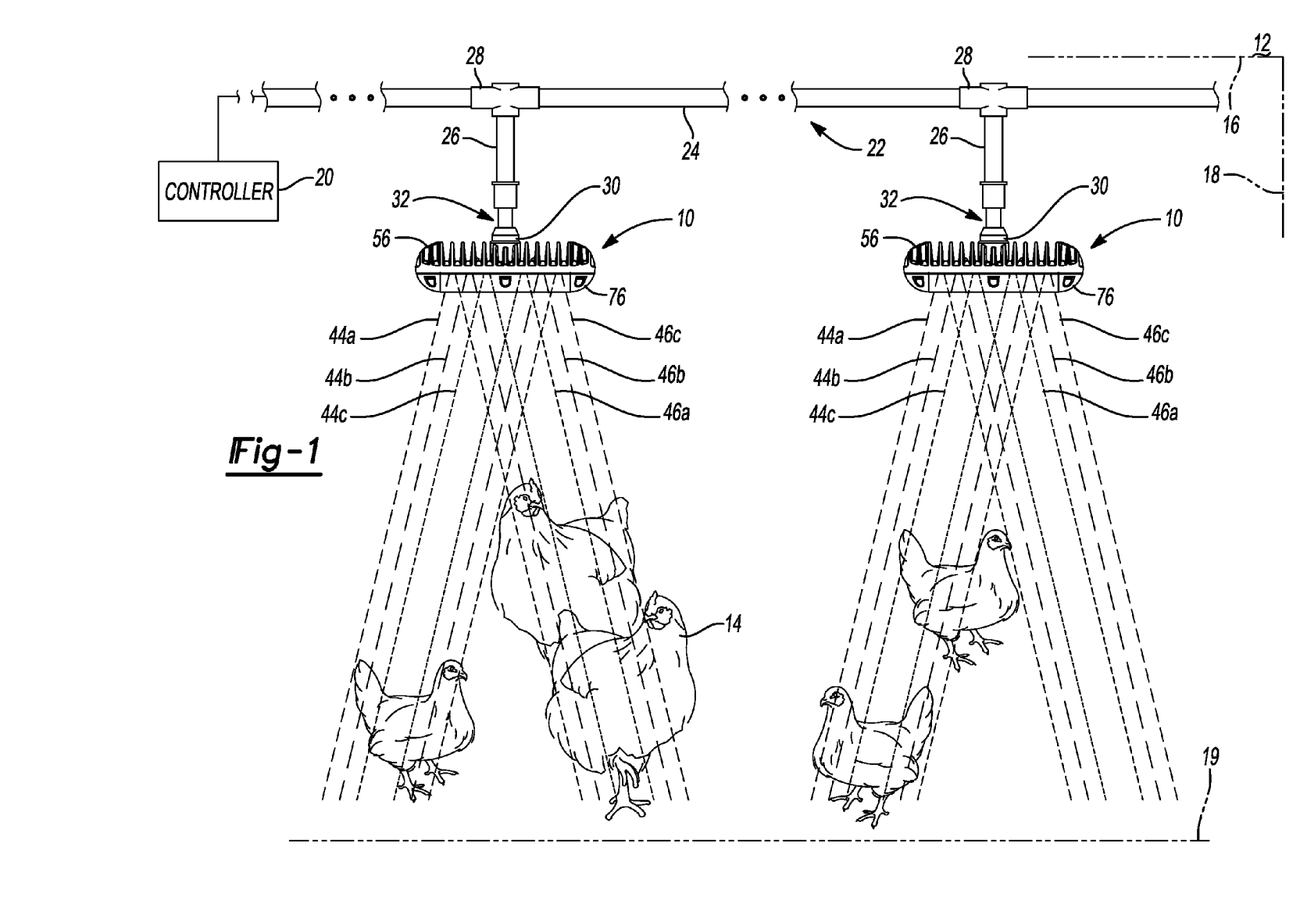
FIG. 1 is an environmental view of a pair of lighting fixtures constructed in accordance to one example of the present teachings and shown in an exemplary poultry house.

With initial reference to FIG. 1, a lighting fixture constructed in accordance to one example of the present teachings is shown and generally identified at reference numeral 10. As illustrated in the exemplary configuration of FIG. 1, a plurality air of lighting fixtures 10 are arranged in a facility 12 for housing animals within a well ventilated and temperature controlled environment. The facility 12 may be used to house a wide variety of animals, such as chickens, turkeys, hogs, or virtually any other animal requiring a relatively controlled temperature and light environment for adequate growth or production of food, such as eggs for example. While the following discussion is directed toward the lighting fixture 10 for illuminating a facility 12 that houses poultry such as chickens 14, this is in no way intended to limit the application of the disclosure to such animals. In this regard, those skilled in the art will appreciate that the lighting fixture 10 and more generally the facility 12 described herein is readily adaptable with little or no modification for use with a wide variety of animals, which may be sensitive to variations in lighting.

In general, the facility 12 may include any conventional poultry housing and may include a roof 16, various sidewalls 18 and a floor 19 that cooperate to form an enclosure around the lighting fixtures 10 and the respective chickens 14. One such exemplary facility is disclosed in commonly owned U.S. Pat. No. 7,658,165, which is hereby expressly incorporated by reference. Each lighting fixture 10 can generally be electrically connected to a controller 20 through an electrical connector assembly 22. The exemplary electrical connector assembly 22 can include a main wire harness 24 that electrically connects through auxiliary wire harnesses 26 to the respective lighting fixtures 10. Various couplings can be used to branch off additional electrical connections, as needed, from the main wire harness 24 through couplings 28 to the auxiliary wire harnesses 26. Electrical connectors 30 can be arranged on respective ends 32 of each auxiliary wire harness 26 for threadably mating with respective connector fittings 36 (FIG. 4) on the lighting fixtures 10. The electrical connectors 30 and the electrical connector assembly 22 as a whole can provide a simple and quick solution to easily add, replace or relocate various lighting fixtures 10 above the chickens 14 in the facility.

While only two lighting fixtures 10 are illustrated in FIG. 1, those skilled in the art will readily appreciate that many additional lighting fixtures 10 can be connected through the main wire harness 24 to the controller 20. In one example, a plurality of lengthwise rows of lighting fixtures 10, as well as a plurality of widthwise rows of lighting fixtures 10 can be configured throughout the facility 12 to create a grid-like pattern of lighting fixtures 10. In this regard, the lengthwise rows can be arranged parallel with the wire harness 24. The wire harness 24 can be mounted along railings (not specifically shown) extending generally below the roof 16.

According to one implementation, a lighting fixture 10 can be provided at approximately three or four meters or other application desired intervals along each of the rows of lighting fixtures 10. Such a distribution can encourage uniform distribution of the light around the floor 19. Each lighting fixture 10 can also be elevated from the floor 19 at a desired elevation such as three meters. Other configurations are contemplated. Those skilled in the art will appreciate that an intensity of light measured on the floor 19 can be varied by moving the lighting fixtures 10 closer or further from the floor 19 according to a particular application.

With continued reference to FIG. 1 and additional reference to FIG. 2, additional features of the lighting fixture 10 will be discussed in greater detail. As will become appreciated from the following discussion, each lighting fixture 10 can be configured to emit light having a first and/or a second color. According to the exemplary configuration provided herein, the first and second colors can be green and blue (or white and red), respectively. In general, each lighting fixture 10 can have a first group of light emitting diodes (LEDs) collectively referred to at reference numeral 40 and individually identified at reference numerals 40a, 40b and 40c. The lighting fixture 10 can further include a second group of LEDs collectively referred to at reference numeral 42 and individually referred to at reference numerals 42a, 42b and 42c. It will be appreciated that while each group 40 and 42 is comprised of three LEDs, additional or fewer LEDs may be provided within each of the first and/or second groups 40 and 42. Furthermore, additional groups of LEDs may be configured for use in each of the lighting fixtures 10.

Returning now to FIG. 1, the first group of LEDs 40 can be configured to emit respective light beams 44a, 44b and 44c from the LEDs 40a, 40b and 40c, respectively. Similarly, the second group of LEDs 42 can be configured to emit first, second and third light beams 46a, 46b and 46c from the LEDs 42a, 42b and 42c, respectively. According to the exemplary configuration, the light beams 44a, 44b and 44c can emit a green (or white) light whereas the light beams 46a, 46b and 46c can emit a blue (or red) light. In another example, the light beams 44a, 44b, 44c, 46a, 46b and 46c can emit blue, green, blue, green, blue and green lights, respectively. In another example, the same light beams 44a, 44b, 44c, 46a, 46b and 46c can emit red, white, red, white, red and white light, respectively. Again, it will be appreciated that any combination of blue and green (or red and white) LEDs can be configured for use within the lighting fixture 10. In this way, while the first group of LEDs 40 has been described as collectively emitting a green (or white) light and the second group of LEDs 42 has been described as collectively emitting a blue (or red) light, the first and/or second groups of LEDs 40 and 42 can have any combination of independently or collectively controlled blue, red, green and white LEDs.

Figure 2:
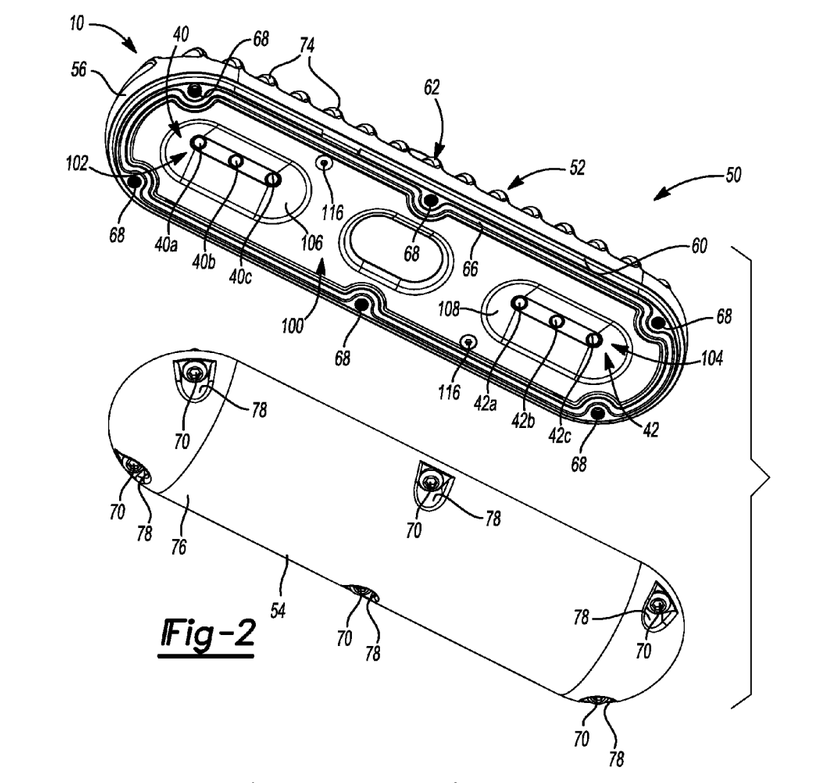
FIG. 2 is a partial exploded view of the lighting fixture illustrating a body portion and a cover portion.

With specific reference now to FIG. 2, the lighting fixture 10 can generally include a lighting housing 50 that has a body portion 52 and a cover portion 54. The body portion 52 can generally include an elongated body 56 that has a generally planar first inboard surface 60 and a generally cylindrical outboard surface 62. The planar first inboard surface 60 can include a groove or channel 66 that is formed generally around a perimeter of the body 56. A plurality of threaded bores 68 can be provided around the perimeter of the body 56 for threadably receiving fasteners 70 to couple the cover portion 54 to the body portion 52. A plurality of heat dissipating fins 74 can be arranged around the outboard surface 62. In one example, the body 56 can be formed of a rigid heat conductive material, such as metal or plastic for example.

The cover portion 54 can generally comprise an elongated transparent cover 76 that matches the profile of the elongated body 56. A series of inset portions 78 can be formed around the perimeter of the transparent cover 76 for accepting portions of the fasteners 70. The transparent cover 76 can be formed of clear or substantially clear material, such as polycarbonate, plastic or glass. In some examples, the transparent cover 76 can have a V0 flammability rating.

Figure 3:
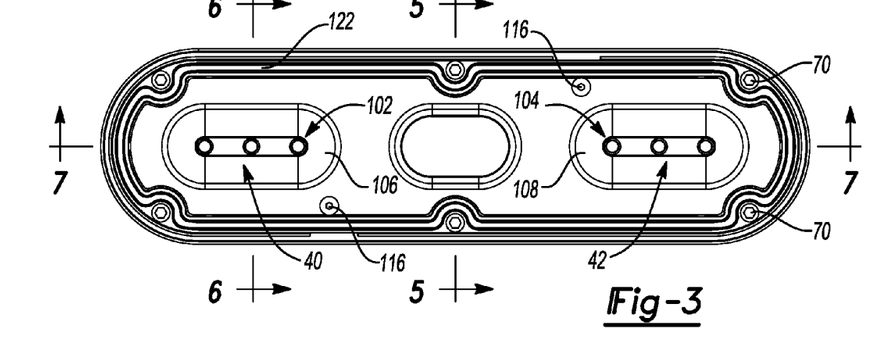
FIG. 3 is a plan view of the body portion of the lighting fixture of FIG. 2.
Figure 4:
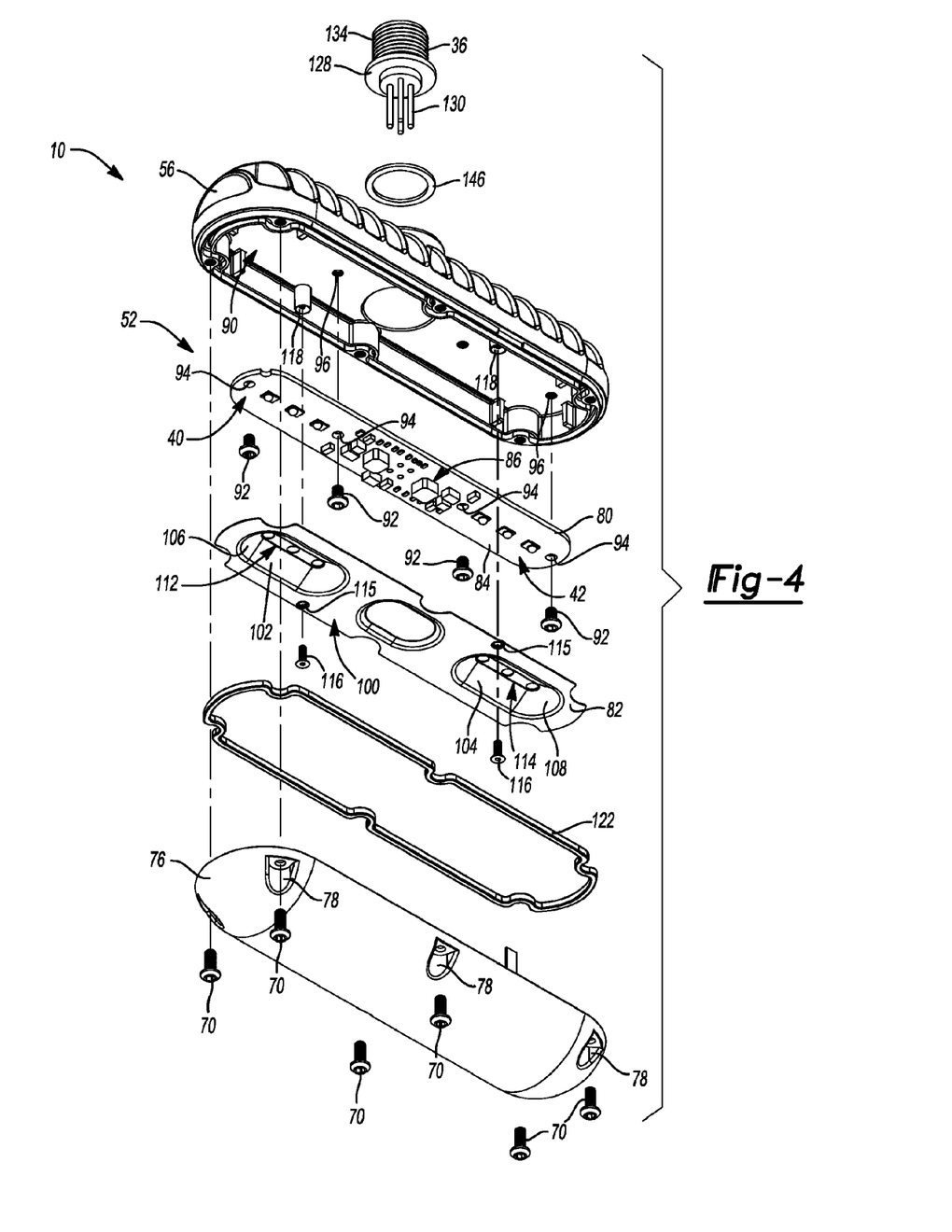
FIG. 4 is an exploded view of the lighting fixture of FIG. 1.

With further reference now to FIGS. 3 and 4, the lighting fixture 10 will be described in greater detail. The body portion 52 can collectively include the body 56, a printed circuit board (PCB) 80 and a reflector 82. The PCB 80 can generally have an elongated body portion 84 that has the first and second groups of LEDs 40 and 42 mounted thereon. The PCB 80 can further comprise a driver 86 mounted on the body portion 84. The driver 86 can be configured to be electrically connected to the connector fitting 36 and the first and second groups of LEDs 40 and 42 through the PCB 80. The driver 86 can receive a signal from the controller 20 through the electrical connector assembly 22 and independently control an output (i.e., an operating state, such as "on" or "off", a duration of illumination, an intensity of illumination, etc.) of the respective first and second groups of LEDs 40 and 42 as will be further discussed herein. In other examples, the driver 86 can be optional and a driver can alternatively be provided as part of a central power supply. Such a power supply can be configured to activate up to six rows of light fixtures 10 where each row has four light fixtures 10. In such an implementation, the light fixture can have two groups of three LEDs, with no other electrical components.

Figure 7:
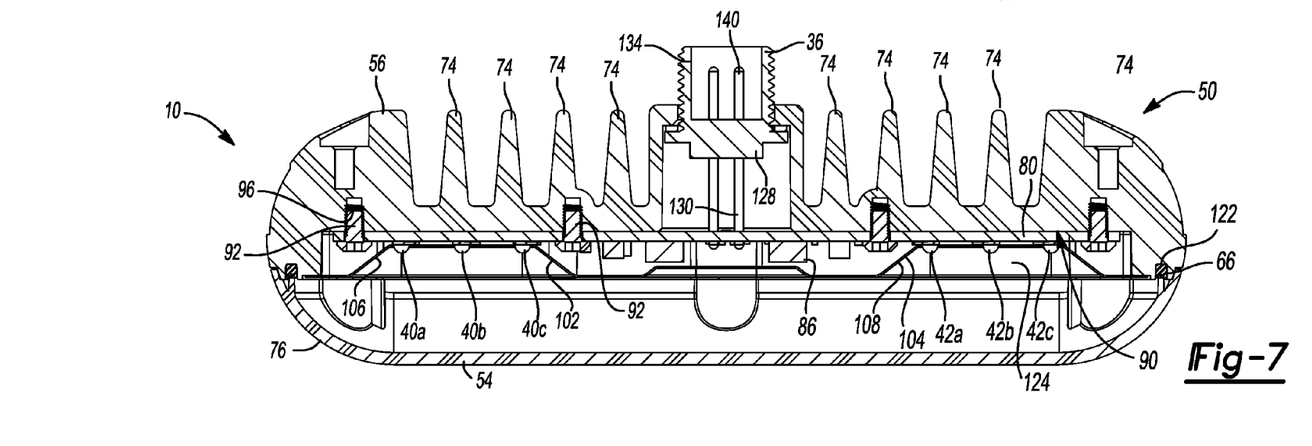
FIG. 7 is a cross-sectional view of the lighting fixture taken along line 7-7 of FIG. 3.

When assembled, the PCB 80 can generally engage a second inboard surface 90 provided on the body 56 of the body portion 52 (see also FIG. 7). In the exemplary configuration, a series of fasteners 92 can pass through a respective series of apertures 94 formed through the body portion 84 of the PCB 80 and threadably mate with a complementary series of threaded bores 96 formed in the second inboard surface 90 of the body 56. In the example provided, the body portion 84 of the PCB 80 can provide a contact surface across substantially the entire surface of the PCB 80 with the second inboard surface 90 of the body 56 to encourage heat transfer to the body 56 for encouraging heat dissipating properties.

With specific reference now to FIGS. 2-4 and 7, the reflector 82 will be described in greater detail. The reflector 82 can generally comprise a planar portion 100 and a pair of recessed portions 102 and 104. The recessed portions 102 and 104 can substantially align with the first and second groups of LEDs 40 and 42 as best illustrated in FIG. 2. The recessed portions 102 and 104 can further include tapered reflector walls 106 and 108, respectively. The tapered reflector walls 106 and 108 generally taper in a direction toward the first and second groups of LEDs 40 and 42, respectively. In one example, the first and second groups of LEDs 40 and 42 can at least partially extend into the recessed portions 102 and 104 of the reflector 82 (see also FIGS. 6 and 7).

The geometry of the respective tapered walls 106 and 108 can facilitate a disbursement of the light beams 44a, 44b, 44c and 46a, 46b and 46c. In one example, the reflector 82 can be formed of a reflective material, such as metal for example. A first and second series of apertures 112 and 114 can be formed through the recessed portions 102 and 104 of the reflector 82 for aligning substantially with and partially receiving the respective LEDs 40a, 40b, 40c and 42a, 42b and 42c (see also FIG. 7). A pair of holes 115 can be formed through the reflector 82 for accepting fasteners 116 that can threadably mate with bores 118 provided on the body 56.

An elastomeric seal 122 having a geometry that substantially conforms to the channel 66 can locate into the channel 66 for providing a seal between the transparent cover 76 and the body 56. The lighting housing 50 can therefore provide a substantially water tight internal space 124 for housing the PCB 80 and the reflector 82.

Figure 5:
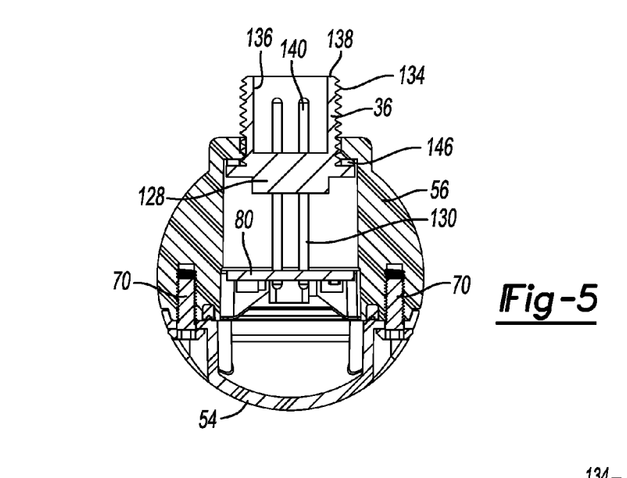
FIG. 5 is a cross-sectional view of the lighting fixture taken along line 5-5 of FIG. 3.
Figure 6:
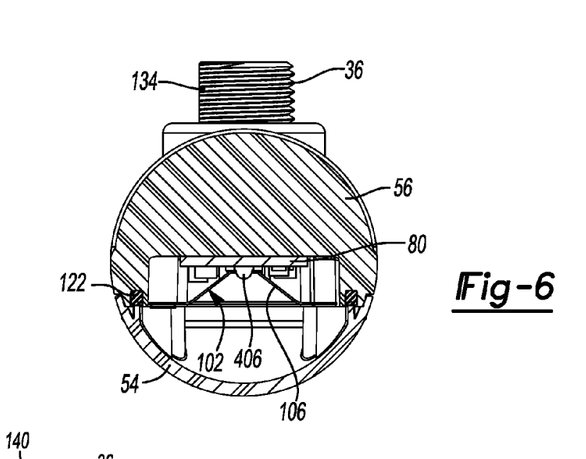
FIG. 6 is a cross-sectional view of the lighting fixture taken along line 6-6 of FIG. 3.

Turning now to FIGS. 5-7, additional features of the lighting fixture 10 will be described. The connector fitting 36 can have a connector body 128 that includes a series of conductive members 130 extending from a first end 132. The first series of conductive members 130 can electrically connect with the PCB 80. The connector body 128 can further include a threaded collar 134 having a female receiving portion 136 on a second end 138. A second series of conductive members 140 can extend from the connector body 128 and into the female receiving portion. The electrical connector 30 (FIG. 1) can have a complementary series of receiving portions (not specifically shown) that accept the second series of conductive members 140. A threaded collar (not specifically shown) on the electrical connector 30 can mate with the threaded collar 134 on the connector fitting 36. An elastomeric seal 146 can be disposed between the connector body 128 and the body 56 of the lighting housing 50. The elastomeric seal 146 can inhibit moisture from entering the internal space 124 around the connector body 128 of the connector fitting 36.

Figure 8:
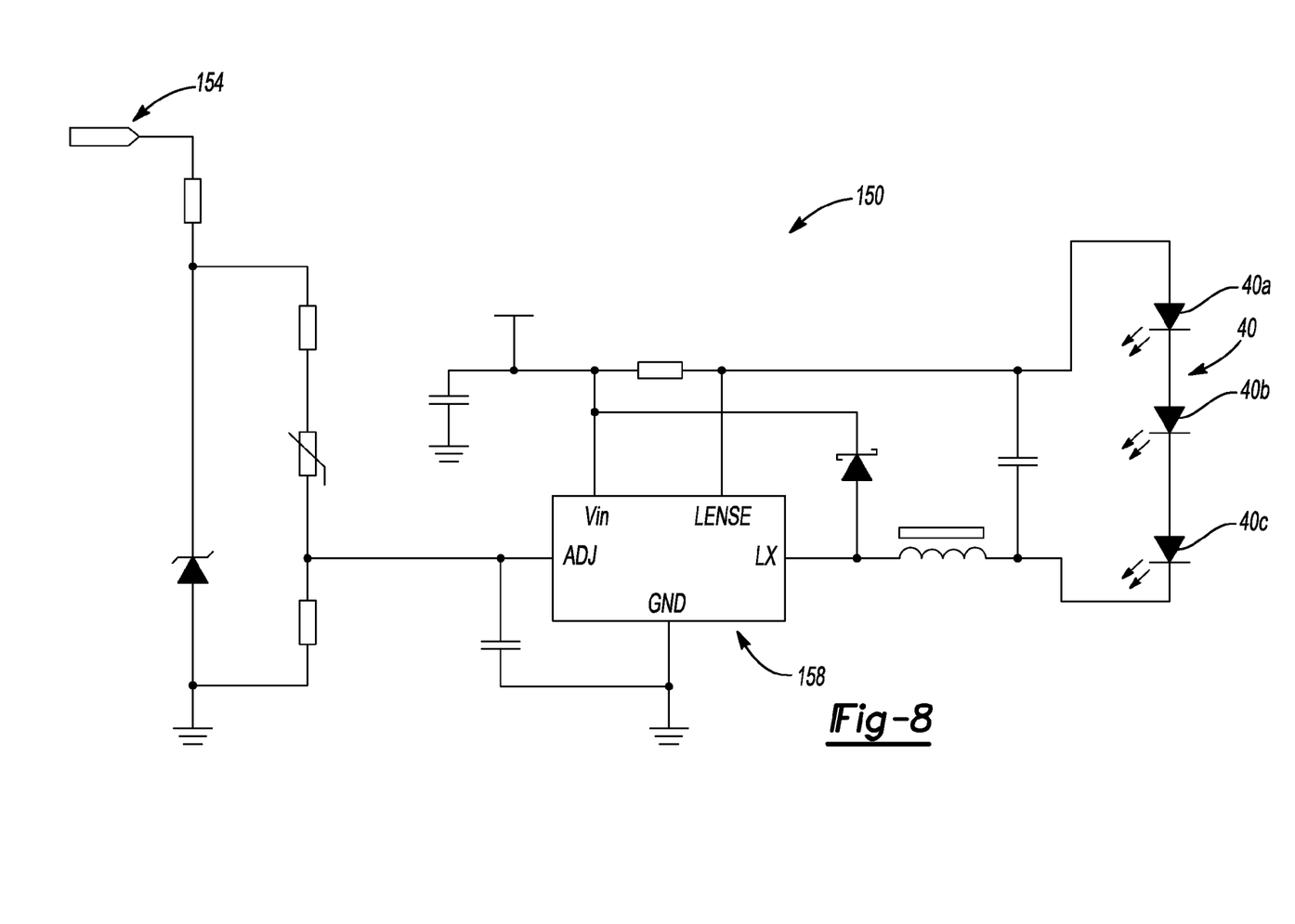
FIG. 8 is an exemplary schematic of a driver of the lighting fixture according to one example.

With reference to FIG. 8, an exemplary schematic diagram that may be used for the driver 86 is shown and generally identified at reference numeral 150. The exemplary schematic diagram 150 can be used to control illumination of the LEDs 40a, 40b and 40c of the first group of LEDs 40. A similar circuit can be provided (not shown) for controlling illumination of the LEDs 42a, 42b and 42c of the second group of LEDs 42. In examples where colors are blended in each group, (e.g., green, blue, green, and blue, green, blue) then all green can be controlled together, and all blue can be controlled together. In this regard, All LEDs of same color can be controlled together, no matter where they are located on PCB 80. Those skilled in the art will readily appreciate that other circuits may be used to control illumination of the first and second groups of LEDs 40 and 42. In general, the exemplary schematic diagram includes an input control 154 that electrically connects a control module 158 with the controller 20. The control module 158 can be an application specific integrated circuit (ASIC), an electronic circuit, a processor (shared, dedicated, or group) and memory that execute one or more software or firmware programs, a combinational logic circuit, or other suitable components that provide the described functionality.

The control module 158 can electrically communicate with the controller 20 to deliver a voltage across the LEDs 40a, 40b and 40c. In this regard, the controller 20 can be selectively configured (by an operator, etc.) to regulate the illumination of the LEDs 40a, 40b and 40c according to the particular needs of a given facility 12 and/or animals 14. For example, the controller 20 can be configured to turn "on" or "off" the first or second groups of LEDs 40 and 42 independently. It may be desired to turn on only the first group of LEDs 40 (i.e. the green LEDs) for a period of time prior to turning no the second group of LEDs 42 (i.e. the blue LEDs). In some examples both of the first group of LEDs 40 and second group of LEDs 42 may be turned on concurrently or have an overlapping period of concurrent illumination. Moreover, in some instances it may be desired to only turn "on" (or "on" at a reduced intensity such as 50% for example) some of the lighting fixtures 10 in the facility 12 in the event that only some of the first or second groups of LEDs 40 and 42 are needed. In sum, the controller 20 can be configured to independently control illumination of all the LEDs 40a, 40b, 40c, 42a, 42b, 42c in all of the lighting fixtures 10 throughout the facility 12 according to the particular application.

In some examples, the power delivered to the first and second groups of LEDs 40, 42 can be reduced when the temperature of the lighting fixture exceeds a threshold. In this regard, a thermistor can be provided on the lighting fixture 10, and/or on a central power supply in cases where the driver 86 is located remotely from the lighting fixture 10. The thermistor can measure a temperature (such as ambient temperature of the facility 12 and/or temperature of the lighting fixtures 10) and calculations can be made based on the measured temperature. Power, i.e., voltage delivered to the first and second groups of 40, 42 can be reduced such that heat generated by the lighting fixtures 10 can be reduced. Other thermal protection components and methods are contemplated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lighting fixture for a poultry housing, the lighting fixture comprising:
   an elongated body;
   a transparent cover that is selectively coupled to the body and is configured to create an internal space with the body;
   a first light emitting diode (LED) disposed in the internal space and that emits a light having a first color; and
   a second LED disposed in the internal space that emits a light having a second color that is distinct from the first color;
   wherein an output of the first and second LEDs is configured to be independently controlled;
   wherein each of the first and second LEDs are disposed on a printed circuit board; and
   wherein a plurality of heat dissipating fins extend from the body and the body has a threaded bore that receives a coupling including a plurality of electrically conductive wires extending therefrom to engage into a female receiving portion of a wire harness that electrically connects the printed circuit board of each of the first and second LED's with a controller upon threadably connecting the coupling and wire harness together.

2. The lighting fixture of claim 1, further comprising a driver disposed in the internal space that is configured to independently control the output of the first and second LEDs.

3. The lighting fixture of claim 1, further comprising a reflector disposed in the internal space and that is configured to reflect the emitted light from the first and second LEDs toward the transparent cover.

4. The lighting fixture of claim 3 wherein the reflector has a generally planar portion that surrounds a first recessed portion, wherein at least one of the first and second LEDs is arranged in the internal space at a location such that the emitted light is transmitted through the first recessed portion.

5. The lighting fixture of claim 4 wherein the first recessed portion is formed by first reflector walls that taper in a direction toward the at least one of the first and second LEDs.

6. The lighting fixture of claim 4, wherein the first and second LEDs are disposed on the same printed circuit board.

7. The lighting fixture of claim 6, further comprising a driver that is disposed on the same printed circuit board and that is configured to electrically communicate with the controller to control the first and second LEDs.

8. The lighting fixture of claim 6, further comprising a seal disposed between the body and the transparent cover that inhibits moisture from entering the internal space.

9. The lighting fixture of claim 4, further comprising a third LED disposed generally adjacent to the first and second LEDs and that transmits a light having a third color through the first recessed portion.

10. The lighting fixture of claim 9 wherein the third color is the same as the first color and wherein the first, second and third LEDs cooperate to form a first group of LEDs.

11. The lighting fixture of claim 10, further comprising a fourth, fifth and sixth LED disposed in the internal space that cooperate to form a second group of LEDs, each of the fourth, fifth and sixth LEDs emitting a light having either the first or second colors.

12. The lighting fixture of claim 11 wherein the reflector further includes a second recessed portion and wherein the second group of LEDs collectively transmit light through the second recessed portion, the second recessed portion formed by second reflector walls that taper in a direction toward the second group of LEDs.

13. The lighting fixture of claim 12 wherein the first color is one of blue or white and the second color is one of green or red.

14. A lighting fixture for a poultry housing, the lighting fixture comprising:
   an elongated body;
   a transparent cover that is selectively coupled to the body and is configured to create an internal space with the body;
   a first light emitting diode (LED) disposed in the internal space and that emits a light having a first color;
   a second LED disposed in the internal space that emits a light having a second color that is distinct from the first color; and
   a reflector disposed in the internal space and that has first and second recessed portions formed by first and second reflective walls, respectively, wherein the first reflector walls taper in a direction toward the first LED and the second reflector walls taper in a direction toward the second LED, wherein the reflector is configured to reflect the emitted light from the first and second LEDs toward the transparent cover;
   wherein an output of the first and second LEDs is configured to be independently controlled;
   wherein first and second LEDs are disposed on a printed circuit board;
   wherein the body has a threaded bore that receives a coupling connected with a wire harness that electrically connects the printed circuit board of each of the first and second LED's with a controller; and
   wherein a first elastomeric seal is provided between the coupling and the elongated body that is compressed by threadably engaging the threaded coupling to the body, and a second elastomeric seal is provided between the transparent cover and the elongated body that is compressed by threaded fasteners coupling the transparent cover to the body.

15. The lighting fixture of claim 14, further comprising:
   a driver that is configured to electrically communicate with a controller to control the first and second LEDs.

16. The lighting fixture of claim 14 wherein the first LED comprises three first LEDs that cooperate to form a first group of LEDs that all transmit light through the first recessed portion and wherein the second LED comprises three second LEDs that cooperate to form a second group of LEDs that all transmit light through the second recessed portion, wherein the first group of LEDs transmit one of green or red light and the second group of LEDs transmit one of blue or white light.

17. The lighting fixture of claim 16, further comprising a plurality of lighting fixtures that are electrically connected through a connector assembly having a wire harness and wherein a threaded coupling connects each lighting fixture of the plurality of lighting fixtures with the wire harness.

18. A lighting fixture for a poultry housing, the lighting fixture comprising:

an elongated body having a centrally positioned connector fitting arranged thereon;

a transparent cover that is selectively coupled to the body and is configured to create an internal space with the body;

a first plurality of light emitting diodes (LEDs) disposed in the internal space and that all emit a green light;

a second plurality of LEDs disposed in the internal space that all emit a blue light, wherein the connector fitting is positioned between the first and second plurality of LEDs; and a reflector disposed in the internal space and that has first and second recessed portions formed by first and second reflective walls, respectively, wherein the first reflector walls taper in a direction toward the first plurality of LEDs and the second reflector walls taper in a direction toward the second plurality of LEDs, wherein the reflector includes a generally planar portion surrounding a distal end of the first and second reflective walls, respectively, and wherein the reflector defines a complementary plurality of holes that are configured to at least partially accept the first and second plurality of LEDs and reflect the emitted light from the first and second plurality of LEDs toward the transparent cover;

wherein an output of the first and second plurality of LEDs is independently controlled;

wherein each of the first and second plurality of LEDs are disposed on a printed circuit board; and wherein a plurality of heat dissipating fins extend from the body and the body has a threaded bore that receives a coupling connected with a wire harness that electrically connects the printed circuit board of each of the first and second plurality of LED's with a controller.

19. The lighting fixture of claim 18, further comprising:

a driver that is configured to electrically communicate with a controller to control the first and second plurality of LEDs.

* * * * *